May 2, 1967 G. J. LUKAS 3,317,003
MULTIPLE VALVE FLUID FEEDER
Filed June 26, 1964 2 Sheets-Sheet 1
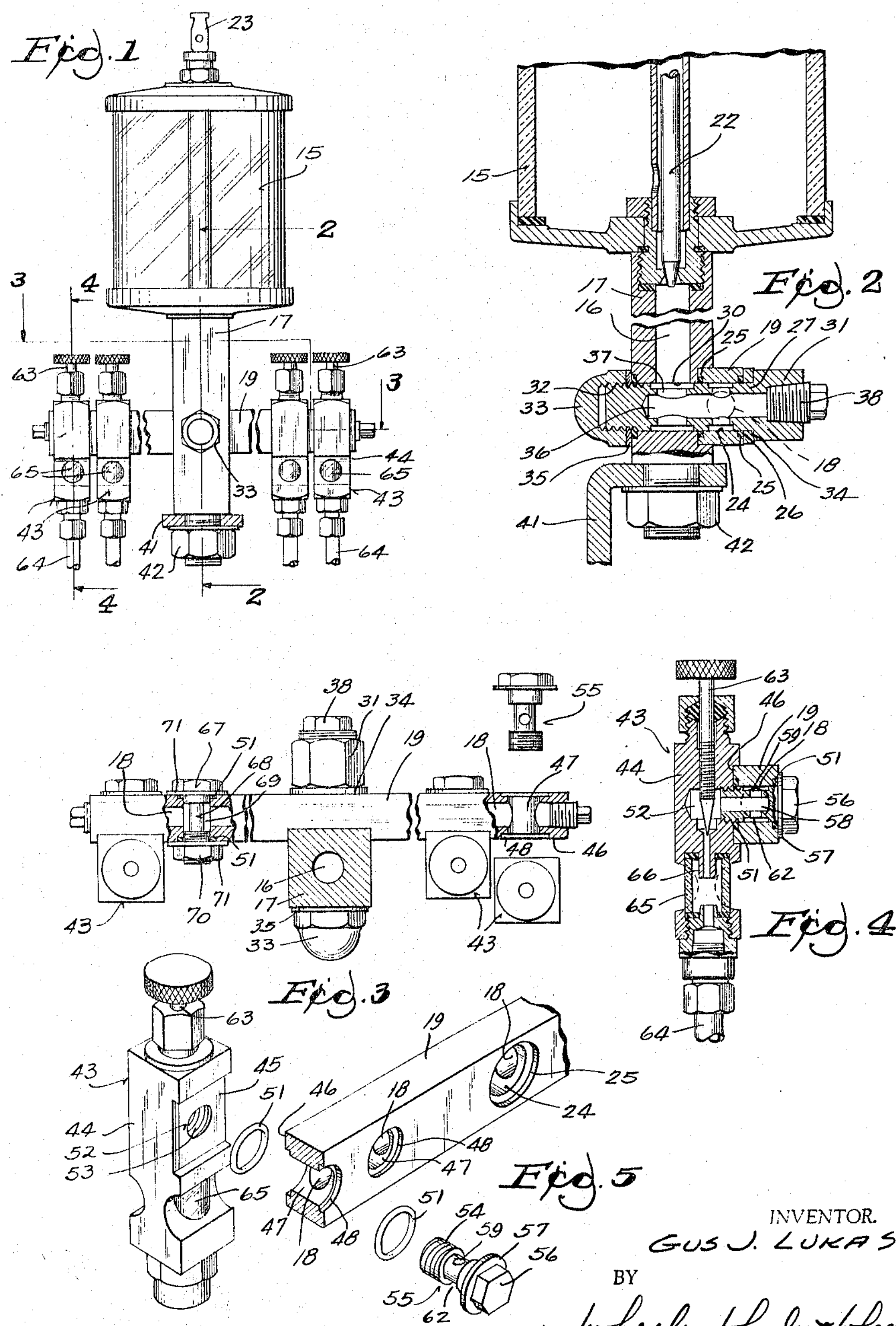
INVENTOR.
GUS J. LUKAS
BY
Wheeler, Wheeler & Wheeler
ATTORNEYS MULTIPLE VALVE FLUID FEEDER
Filed June 26, 1964 2 Sheets-Sheet 2
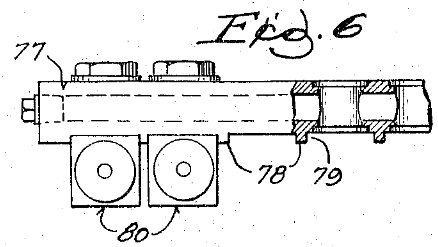
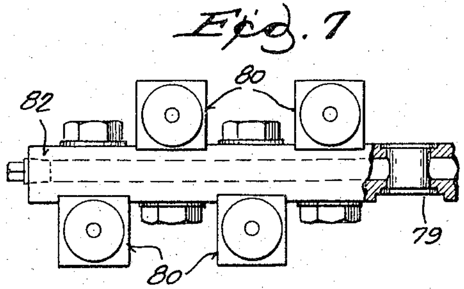
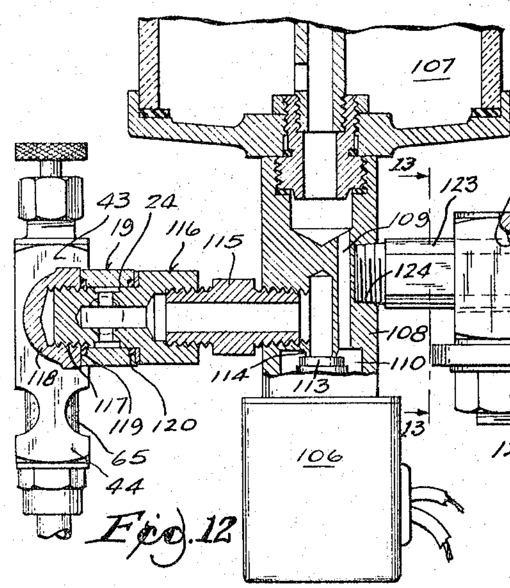
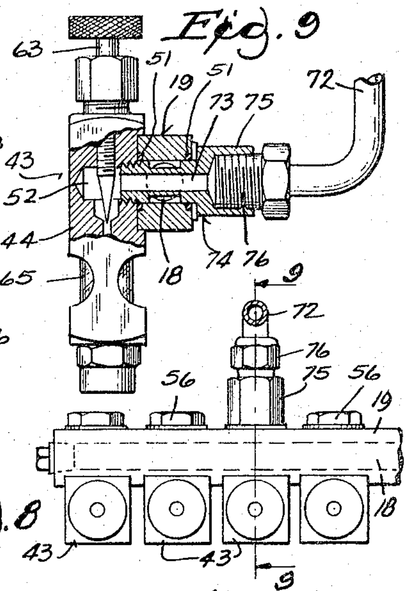
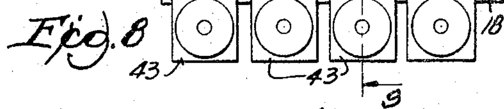
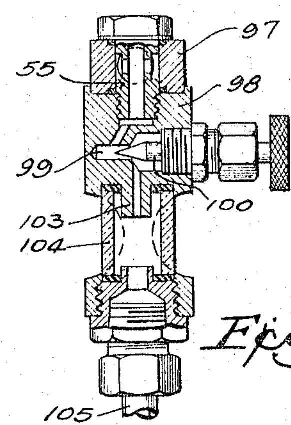
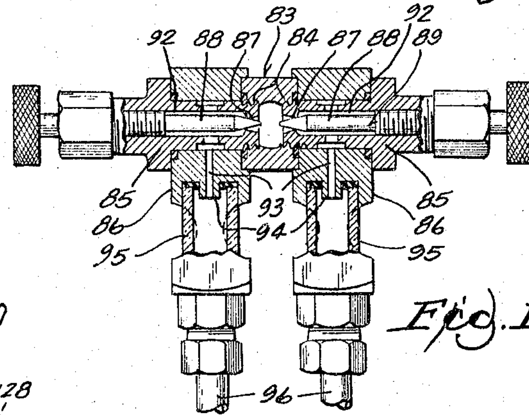
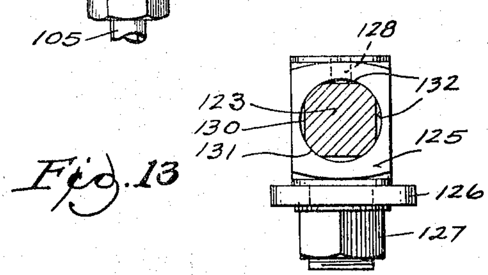
INVENTOR.
GUS J. LUKAS
BY
Wheeler, Wheeler & Wheeler
ATTORNEYS United States Patent Office 3,317,003

Patented May 2, 1967

1

3,317,003

MULTIPLE VALVE FLUID FEEDER

Gus J. Lukas, Manitowoc, Wis., assignor to Lube Devices, Inc., Manitowoc, Wis., a corporation of Wisconsin Filed June 26, 1964, Ser. No. 378,116
7 Claims. (Cl. 184—81)

This invention relates to a multiple valve fluid feeder.

The feeder of the present invention is adapted to control the feed of any fluid, including liquids such as oil, and gases, such as compressed air. The invention is exemplified herein as applied to a multiple valve oiler.

United States Patent 2,646,856 shows a multiple valve oiler in which the valve bodies abut laterally and have intercommunicating ducts which form an oil passage from one valve body to the next. These valve bodies are clamped together with tie rods. The length of the tie rods is determined by the number of valve bodies in the assembly. In the device of the prior patent, it is not possible to remove one or another of the valves from the assembly without disassembling all of the components. Moreover, valves may not be added or subtracted from the assembly without shortening or lengthening the tie rods in accordance with the number of valves added or subtracted. These manipulations are more complex than can be done with the oiler mounted on its machine. It must be taken off the machine and transferred to a work bench.

In accordance with the present invention, the respective valves are independent of one another and are independently removably attached to a common manifold. Accordingly, one or another of the valves can be removed or replaced without disturbing the mounting of the other valves. This operation is very simple and does not require removal of the feeder from the machine on which it is mounted. Where a valve is completely removed from the feeder, it may be replaced by a blind plug.

Further in accordance with the present invention, the manifold may serve as a mounting bracket for a valve which is not in fluid communication with the manifold passage and may have a separate source of fluid. This is quite unlike the device of the prior patent aforesaid in which all valves must be in fluid communication with one another to maintain fluid flow.

Moreover, the entire manifold and all valves mounted thereon may be removed from a bracket mounting the device of the present invention without disturbing the mounting of the fluid source. This is because the fluid source and the manifold are independently connected to a common mounting block. In accordance with the present invention, the manifold has a releasable coupling to the mounting block.

Other objects, features and advantages of the present invention will appear from the following disclosure in which:

FIGURE 1 is a fragmentary side elevation of one embodiment of a multiple valve fluid feeder embodying the present invention.

FIGURE 2 is a cross section taken along the line 2—2 of FIGURE 1.

FIGURE 3 is a cross section taken along the line 3—3 of FIGURE 1.

FIGURE 4 is a cross section taken along the line 4—4 of FIGURE 1.

FIGURE 5 is a fragmentary perspective view showing the manifold and a valve and valve mounting bolt in spaced relation.

FIGURE 6 is a fragmentary plan view of a modified form of manifold with attached valve bodies, a portion of the manifold being broken away and shown in cross section.

FIGURE 7 is a view similar to FIGURE 6 but of a still further modified embodiment in which valve bodies may be mounted in staggered relation on opposite sides of the manifold.

2

FIGURE 8 is a view similar to FIGURE 3 and showing a valve having a separate source of fluid mounted on the manifold.

FIGURE 9 is a cross section taken along the line 9—9 of FIGURE 8.

FIGURE 10 is a cross section showing a modified embodiment of manifold and different form of valve coupled thereto.

FIGURE 11 is a cross section of a further modification showing two valves mounted at opposite sides of the manifold, each having needle valve stems adjustable toward and away from the manifold.

FIGURE 12 is a view similar to FIGURE 2 but showing a modified embodiment in which there is a solenoid valve controlling fluid flow from the fluid reservoir to the manifold.

FIGURE 13 is a cross section taken along the line 13—13 of FIGURE 12.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Like parts are given the same reference characters in the several views.

As in the prior patent aforesaid, a fluid such as lubricating oil is stored in a source reservoir 15 from which it will flow by gravity through the interior passage 16 of a mounting block 17 and into the interior passage 18 of manifold 19. In the embodiment shown in FIGURES 1 and 2, fluid flow from reservoir 15 into mounting block passage 16 is controlled manually by valve 22 having a control toggle 23 at the upper end thereof. Details of the valve structure will not be further described as these are old, per se.

In this embodiment of the invention, the manifold 19 is provided as shown in FIGURE 5 with a lateral through bore or duct 24 which is counterbored at 25 at both sides of the manifold to receive sealing gaskets 26 (FIGURE 2) which seal about a through bolt or coupling 27 which extends through the bore 24 of the manifold 19 and a registering passage 30 formed through the mounting block 17. One end of the through bolt 27 has a head 31 and the other end is threaded at 32 to receive an acorn nut 33. Head 31 seals against gasket 34 against one side of manifold 19 and nut 33 seals against gasket 35 against the other side of the mounting block 17.

The interior passage 16 of head 17 communicates with interior passage 18 in manifold 19 through an axial duct 36 provided in bolt 27. Where bolt 27 intersects passage 16 in block 17 it is provided with a laterally extending bore or duct 37 for this purpose. The end of passage 36 at the head 21 of bolt 27 is sealed by threaded closure plug 38.

The block 17 is typically mounted on a machine having various parts which require lubrication. For this purpose, block 17 is provided with a mounting bracket 41 clamped to the head 17 by nut 42.

Manifold 19 may be made of any appropriate length to carry as many valves 43 as are needed in its particular installation. Each valve 43 has a valve body 44 which is desirably notched out or relieved at 45 to provide an accurately machined surface to mate with a correspondingly accurately machined surface 46 of the manifold 19, thus to constitute a valve body seat.

The manifold 19 is provided with a series of lateral through ducts or bores 47 which intersect the manifold passage 18 to provide for fluid flow from the manifold into the respective valves 43. These lateral ducts 47 are counterbored at 48 to provide seats for O-ring seals 51. Each valve body 44 has a lateral bore or duct 52 which is tapped at 53 (FIGURE 5) to receive the threaded end 54 of a mounting bolt or coupling 55 which extends completely through the lateral ducts 47 in the manifold 19 and serve to clamp the valve body 44 against the manifold seat 46 and to compress the respective seals 51. Through bolt 55 has a head 56 and an integral washer 57 which bears on its seal 51. Accordingly, when a valve body 44 is coupled to the manifold 19, it is clamped thereto under pressure of the bolt 55 and the seals 51 prevent loss of fluid from the manifold.

Where it is desired that there be fluid communication between fluid passage 18 of manifold 19 and the chamber 52 within the valve body 44, bolt 55 is provided with an axial passage 58 and lateral bore 59 leading therefrom and intersecting passage 18 in manifold 19. The bolt stem is externally grooved at 62 to reduce the cross section of the bolt where it intersects manifold passage 18 and permit free flow of fluid lengthwise of the passage 18 and around the several bolts 55.

Valves 43 are otherwise conventional and include adjustable valve stems 63 which control flow of fluid through the valve to a pipe 64 or the like which leads to a point of fluid discharge. The valve 43 desirably includes a sight glass 65 through which a drip tube 66 is visible so that the rate of liquid flow can be observed.

As shown in FIGURES 1 and 3, the respective valve bodies 44 for the valves 43 are mounted in close proximity one to the other on the manifold 19. One or another of the valves can easily be removed from the manifold simply by removing its retaining bolt 55, as indicated in FIGURE 3. This does not affect in any way the mounting of the other valves 43 which remain connected to the manifold 19.

In the event a valve is to be permanently removed from the feeder, it can be taken off and replaced by a blind plug 67, as shown in FIGURE 3. Plug 67 has a construction somewhat like bolts 55. It cooperates with a nut 70. The plug head and nut have integral washers 71 which clamp on O-ring seals 51 to seal the through bore 47 from which the valve was removed. Plug 67 has a shank 68 externally grooved at 69 so as not to interfere with fluid flow along passage 18 in the manifold 19.

FIGURES 8 and 9 illustrate a modification in which a valve 43 is physically mounted on the manifold 19 but has no fluid communication with passage 18 in the manifold. In this modification, there is a separate fluid source pipe 72 for the valve 43. Pipe 72 communicates to the valve chamber 52 through axial passage 73 of through bolt 74 which has a construction otherwise very similar to through bolt 55, but in which its head 75 is tapped internally in communication with bore 73 to receive a threaded coupling 76 having an interior passage connecting source pipe 72 to the axial bore 73 and thence to the chamber 52 in the valve 43. In this embodiment there is no cross bore such as at 59 in through bolt 55 of FIGURES 4 and 5. Accordingly, there is no communication between passage 18 of manifold 19 with the valve chamber 52. In all other respects, valve 43 of FIGURES 8 and 9 is mounted on manifold 19, the same way as the other valves 43.

FIGURES 6 and 7 show somewhat modified manifold. The manifold 77 of FIGURE 6 is provided on one side thereof with external parallel ribs 78 forming therebetween sockets 79 to receive the various valve bodies 80. Valve bodies 80 are the same as valve bodies 44, except that sockets 45 are omitted therefrom.

In FIGURE 7, the manifold 82 is notched out at its opposite sides to form such sockets 79, the respective notches 79 being disposed in staggered relationship at said opposite sides thus to receive the valve bodies 80 successively at opposite sides of the manifold.

FIGURE 11 shows a modification in which the manifold 83 is provided with transverse through bores or ducts 84 which are tapped to receive threaded mounting bolts or couplings 85 at both sides of the manifold. Each mounting bolt 85 clamps a valve body 86 to the manifold 83. In this construction, the mounting bolt 85 is provided with a valve seat 87 and a needle valve 88 on stem 89. The stems 89 are disposed in chambers 92 which communicate through transverse ducts 93 through drip tubes 94 to sight glass chambers 95 and thence to pipes 96 leading to a point of fluid discharge.

FIGURE 10 shows another modification in which the manifold 97 is turned on its side so that the valve body 98 clamped thereto by mounting bolt 55 depends therefrom. In this embodiment the valve body 98 has a chamber 99 which provides a seat for the needle valve 100 which controls flow through the drip tube 103 into the sight glass 104 and thence to the discharge pipe 105.

In each of the modifications shown in FIGURES 6, 7, 10 and 11, the respective valves are independently removably mounted on the manifold and can be replaced by another valve body or by a blind plug without in any way disturbing the mounting of the other valves on the manifold, as in the embodiment first described.

FIGURE 12 shows a modification in which an electric solenoid valve 106 controls flow of fluid from the reservoir 107 to the manifold 19. In this embodiment, as in the embodiment of FIGURE 2, there is a support block 108 to which the manifold 19 and reservoir 107 are independently connected. Accordingly, in either of the embodiments shown in FIGURES 2 and 12, the manifold 19 and its associated valves 43 can be removed without disturbing the connection from the reservoir or fluid source to the mounting block.

In the embodiment of FIGURE 12, the solenoid valve 106 is mounted on the bottom of the block 108. Fluid from reservoir 107 flows downwardly through block passage 109 into a chamber 110 at the bottom of block 108. The solenoid 106 operates valve plug 113 which acts against a valve seat 114 to control flow of fluid to manifold 19 through a spacer nipple 115 which is tapped into manifold mounting bolt or coupling 116. Mounting bolt 116 is connected to the manifold 19 through its transverse through bore or duct 24 (FIGURE 5). The end of mounting bolt 16 remote from nipple 15 is threaded at 117 to receive the acorn nut 118 (similar to nut 33 of FIGURE 2). When nut 118 is tightened, the seals 119, 120 at opposite sides of the manifold 19 are compressed to prevent loss of fluid.

To remove the manifold 19 and its associated valves 43 from the feeder of FIGURE 12, it is necessary only to remove the acorn nut 118. This releases the manifold without disturbing the mounting of the reservoir 107 on its block 108.

The feeder of FIGURE 12 is suitably supported by a blind stud 123 threaded into a suitably tapped opening 124 in the block 108. Stud 123 is provided with an adjustable connection to the mounting block 125 by set screws 128 and is clamped onto a mounting bracket 126 by nut 127. From the foregoing it is clear that both of the embodiments of FIGURES 2 and 12 achieve the advantages of the invention.

As best shown in FIGURE 13, blind stud 123 is desirable polygonal in cross section (square in the disclosed embodiment) and has a plurality of flat sides 130 against which the set screws 128 of mounting block 125 may selectively be seated. The corners 131 of the stud 123 are rounded on a radius just slightly smaller than the radius of the circular opening 132 in block 125. Accordingly, the stud 123 and block 125 have four (in the disclosed embodiment) defined relative circumferential positions in which they may be clamped by the set screws 128. The parts are rotated through 90° from one position to the next.

Moreover, stud 123 is shiftable axially within the block opening 132 in a range limited by abutment of the block 125 with stud head 133 at one end and with the reservoir base or block 108 at the other end.

Accordingly, the mounting structure of the feeder provides for great flexibility in mounting arrangements to fit various machines.

I claim:

1. A multiple valve fluid feeder comprising a manifold, a plurality of valves mounted thereon, a source of fluid for said manifold, a mounting block, means for mounting said manifold against said block, means for connecting said source to said block, said block having an interior passage communicating from said source to said manifold, and a mounting bracket on said block by which both said source and said manifold are supported by said bracket through said block, the means for connecting the manifold to the block being releasable independently of the means for connecting the source to the block to facilitate assembly and disassembly of the manifold and its valves as a unit with respect to the feeder and without affecting the mounting of the said source on said block.

2. The feeder of claim 1 in which the means for connecting the manifold to the block comprises a through bolt extending completely through the manifold, said through bolt having an interior passage communicating with the block passage and the interior of the manifold and a releasable nut clamping the through bolt to the manifold.

3. A multiple valve fluid feeder comprising an elongate manifold having a longitudinal interior fluid passage and a plurality of lateral ducts intercepting said passage and extending through said manifold from one side to the other, and a plurality of independent valves having valve bodies with valve controlled fluid passages, and means selectively and removably mounting said bodies on said manifold independently of each other with their respective passages in communication with respective lateral manifold ducts, said means to mount respective valves on said manifold comprising respective bolts extended through respective lateral ducts and said manifold and tapped into respective valve bodies.

4. The fluid feeder of claim 3 in which each said bolt has a passage communicating with its valve controlled fluid passage and with said manifold passage.

5. The multiple valve fluid feeder of claim 3 in which said manifold is provided with plugs to seal said lateral ducts of said manifold in place of correspondingly selectively removed valve bodies.

6. A fluid feeder mount comprising a reservoir base, a first mounting block attached thereto and having an internal passage in communication with a reservoir, a stud transversely attached to said mounting block, a second mounting block laterally offset from the first block and adjustable axially and circumferentially about said stud, said second mounting block adaptable for mounting to a machine served by said feeder.

7. A fluid feeder mount in accordance with claim 6 in which said stud is polygonal in cross section with a plurality of flat sides, said second mounting block having a set screw adapted to selectively seat against one or another of said flat sides.

References Cited by the Examiner

UNITED STATES PATENTS

| | | | |
|---|---|---|---|
| 2,837,174 | 6/1958 | Lyden | 184—81 |
| 3,117,587 | 1/1964 | Willinger | 137—454.2 X |

LAVERNE D. GEIGER, *Primary Examiner.*

SAMUEL ROTHBERG, *Examiner.*

H. S. BELL, *Assistant Examiner.*